Patented Aug. 19, 1952

2,607,703

UNITED STATES PATENT OFFICE 2,607,703

PREPARATION OF ACETIC ACID SOLUTIONS OF CELLULOSE ACETATE

William A. Resch and Joseph S. Carruthers, Kingsport, Tenn., assignors to Eastman Kodak Company, Rochester, N. Y., a corporation of New Jersey No Drawing. Application November 23, 1949, Serial No. 129,174

3 Claims. (Cl. 106—183)

This invention relates to the preparation of acetic acid solutions of cellulose acetate having an acetyl content of 42.5–44% by means of magnesium sulfate as the peptizer therefor.

It is often desirable to form solutions of cellulose acetate in concentrated acetic acid, such as for further treatment thereof or for forming products of those esters. In the case of cellulose acetates having an acetyl content of 42.5–44% after they have been stabilized to render substantially free of sulfur, precipitated, and dried, it has been found to be difficult to prepare readily flowable solutions thereof in acetic acid. The use of the acetic acid solutions of cellulose acetate as obtained in the manufacture thereof has been suggested but has various disadvantages such as the difficulty of ending up with a stable cellulose ester and, in addition, the inconvenience of such a procedure unless the cellulose ester is used almost immediately after its preparation. Heretofore, the high acetyl cellulose acetates which have been stabilized by removal of substantially all of the combined sulfur therefrom have not been adapted to the preparation of flowable acetic acid solutions, particularly in the case of the esters of satisfactory viscosity. For instance, solutions of those esters in acetic acid have been attempted by dispersing in hot acetic acid. When, however, the mass returns to normal temperature, it possesses high viscosity and is not flowable or capable of being moved from place to place by means of pumps.

One object of our invention is to provide a method for preparing acetic acid solutions of cellulose acetate having an acetyl content of 42.5–44% which are easily transported and readily handled by the usual type of pumps which are employed for pumping cellulose acetate solutions. Another object of our invention is to prepare acetic acid solutions of cellulose acetate which, although of a readily flowable viscosity, contain only magnesium sulfate as an additional ingredient therein. Other objects of our invention will appear.

We have found that the dissolving of high acetyl cellulose acetates in acetic acid is peptized by the presence in the system of a small proportion of magnesium sulfate resulting in a solution which is readily handled in the equipment usually employed for cellulose ester solutions. The solution may be formed either by first forming a dispersion of the cellulose acetate in glacial acetic acid and then adding the magnesium sulfate thereto, such as in the form of its solution in aqueous acetic acid, or the magnesium sulfate may first be added to the acetic acid and the cellulose acetate may then be dissolved therein. In accordance with our invention it is necessary that the dissolving liquid have a small proportion of water therein, such as an amount within the range of 3–20% in order to assure compatibility of the magnesium sulfate with the dissolving liquid. This water may be supplied by the addition of an aqueous acetic acid solution of the magnesium sulfate or it may be incorporated in the acetic acid which is employed for dissolving the cellulose acetate. The cellulose acetate which is employed in our invention may be an ester, such as results from the process described in U. S. Patent 2,180,009, of Malm, or it may be that prepared by any other process which results in a low sulfur content cellulose acetate of an acetyl content within the range of 42.5–44%. The cellulose acetate which is employed is preferably one which has a tetrachlorethane viscosity of at least 180 seconds when in solution in acetic acid in a 6:1 ratio. The viscosity of an unhydrolyzed cellulose acetate in solution in acetic acid in a 6:1 ratio may be obtained by the method described on page 2 of Malm et al. Patent No. 2,080,054 using the aforesaid acetic acid solution of cellulose acetate in place of the reaction mixture referred to in that description.

The cellulose acetate which is employed and which is substantially free of combined sulfur will ordinarily have a sulfur content on the order of .005%, the upper limit of permissible combined sulfur content being .01%. In the case of the cellulose acetates having a greater combined sulfur content the cellulose acetate will readily dissolve in acetic acid without any further additions being necessary but, on the other hand, such solutions will not result in products of permanent stability. In the case of the applicants' invention solutions are obtained of cellulose esters which will remain stable under severe conditions. The range of combined sulfur in the ester in accordance with our invention may be from .01% as the maximum down to the least proportion which may be present.

The proportion of magnesium sulfate employed may be a proportion of 1–10% based on the cellulose ester. It is preferred for the usual operations that 3% of magnesium sulfate is probably sufficient for most purposes. In practice the magnesium sulfate is dissolved up in an aqueous solution of acetic acid, such that the magnesium sulfate is completely soluble therein but, yet, the water content is not greater than that desired. Aqueous acetic acid of 40 or 50% concentration is ordinarily sufficient for this purpose but variation is, of course, permissible to come within the scope of the invention.

The viscosities listed above are on the basis of 6 parts of liquid to one part of cellulose ester. However, our invention is not limited in scope to those proportions but may include any proportion of acetic acid to water up to 20 parts of the former to one of the latter. Even in the low concentrations of ester to acid, the peptizing effect of the magnesium sulfate is quite pronounced and results in solutions which allow much easier handling than compositions in which the peptizing agents are absent. Even in ratios of greater than 20:1, magnesium sulfate is effective as a peptizer, but the use of higher ratios than this in accordance with our invention are not considered to be practical.

Solutions as prepared in accordance with our invention are useful for preparing products from the cellulose acetate, such as by extruding into a precipitating liquid to form filaments, films or the like. Our invention is also useful for processing cellulose esters wherein the original product lacks uniformity and, therefore, further treatment is desirable to assure uniform heat stability even though the original material has a low sulfur content. For instance, the mixture of the cellulose acetate and glacial acetic acid is mixed with a little magnesium sulfate in solution in aqueous acetic acid, such as in a proportion to supply 1–10% of the magnesium sulfate based on the cellulose acetate being treated. The ester is then re-precipitated from the solution, such as in hot 20% aqueous acetic acid and is then washed and dried. In many cases a distinct improvement in the heat stability of the cellulose ester is obtained by such a treatment.

As the cellulose ester is in dry condition, it is often desirable in forming a solution thereof to first soften or disperse the cellulose ester, such as by treatment with at least some of the acetic acid at an elevated temperature. For instance, the cellulose acetate may first be mixed with acetic acid which has been heated up to a temperature of 120–150° F. and while at that temperature, a solution of magnesium sulfate in 180° F. 40% acetic acid may be thoroughly stirred in the mass. Upon cooling the resulting mass exhibits substantially the same viscosity characteristics as the completed reaction mixture in a process for preparing cellulose acetate by acylating cellulose with acetic anhydride and a sulfuric acid catalyst.

The following example illustrates our invention:

60 parts of cellulose acetate having an acetyl content of 43.5% was mixed with 360 parts of glacial acetic acid in a packeted mixer held at about 130–140° F. The viscosity of the mass after thorough mixing was found to be 180–200 seconds measured by the tetrachlorethane viscosity method. One part of magnesium sulfate in the form of an approximately 2% solution in 40% aqueous acetic acid having a temperature of 180° F. was added to the mass, and the mixing was continued. The total weight of the hot acid solution added was about 0.8 part per part of cellulose acetate present in the dope. The mixing was continued only long enough to assure homogeneity of the materials which were mixed together. The viscosity of the resulting solution was determined (by the tetrachlorethane method referred to above) and was found to be approximately 120 seconds.

We claim:

1. A method of dissolving solid cellulose acetate having an acetyl content of 42.5–44% and substantially free of combined sulfur, in acetic acid, which comprises incorporating, in a mixture of said cellulose acetate and acetic acid, 1–10%, based on the cellulose ester, of preformed magnesium sulfate as a peptizer, the water content of the mass being 3–20% of the acetic acid used whereby the solid cellulose acetate is dissolved.

2. A method for preparing an acetic acid solution of a cellulose acetate substantially free of combined sulfur and having an acetyl content of 42.5–44%, which comprises mixing together said cellulose acetate while in solid form and glacial acetic acid at a temperature of 130–140° F., and then adding to the mass a solution of magnesium sulfate in hot aqueous acetic acid in such proportions that 1–10% of magnesium sulfate, based on the cellulose acetate, a ratio of acetic acid to cellulose acetate of 6:1–20:1 and a water content of 3–20% of the acetic acid used is present therein whereby the solid cellulose acetate is dissolved.

3. A method of preparing an acetic acid solution of substantially sulfur free solid cellulose acetate having an acetal content of 42.5–44% which comprises mixing said cellulose acetate with acetic acid in the presence of approximately 3% of preformed magnesium sulfate as a peptizer based on the cellulose acetate whereby the solid cellulose acetate is dissolved.

WILLIAM A. RESCH.
JOSEPH S. CARRUTHERS.

REFERENCES CITED

The following references are of record in the file of this patent:

UNITED STATES PATENTS

| Number | Name | Date |
|---|---|---|
| 2,203,749 | Seymour et al. | June 11, 1940 |
| 2,329,704 | Dreyfus | Sept. 21, 1943 |
| 2,329,718 | Haney et al. | Sept. 21, 1943 |

FOREIGN PATENTS

| Number | Country | Date |
|---|---|---|
| 524,634 | Great Britain | Aug. 12, 1940 |

OTHER REFERENCES

Ott, "High Polymer—vol. V. Cellulose and Derivatives," 1943, pp. 973 and 974.